Patented Feb. 24, 1953

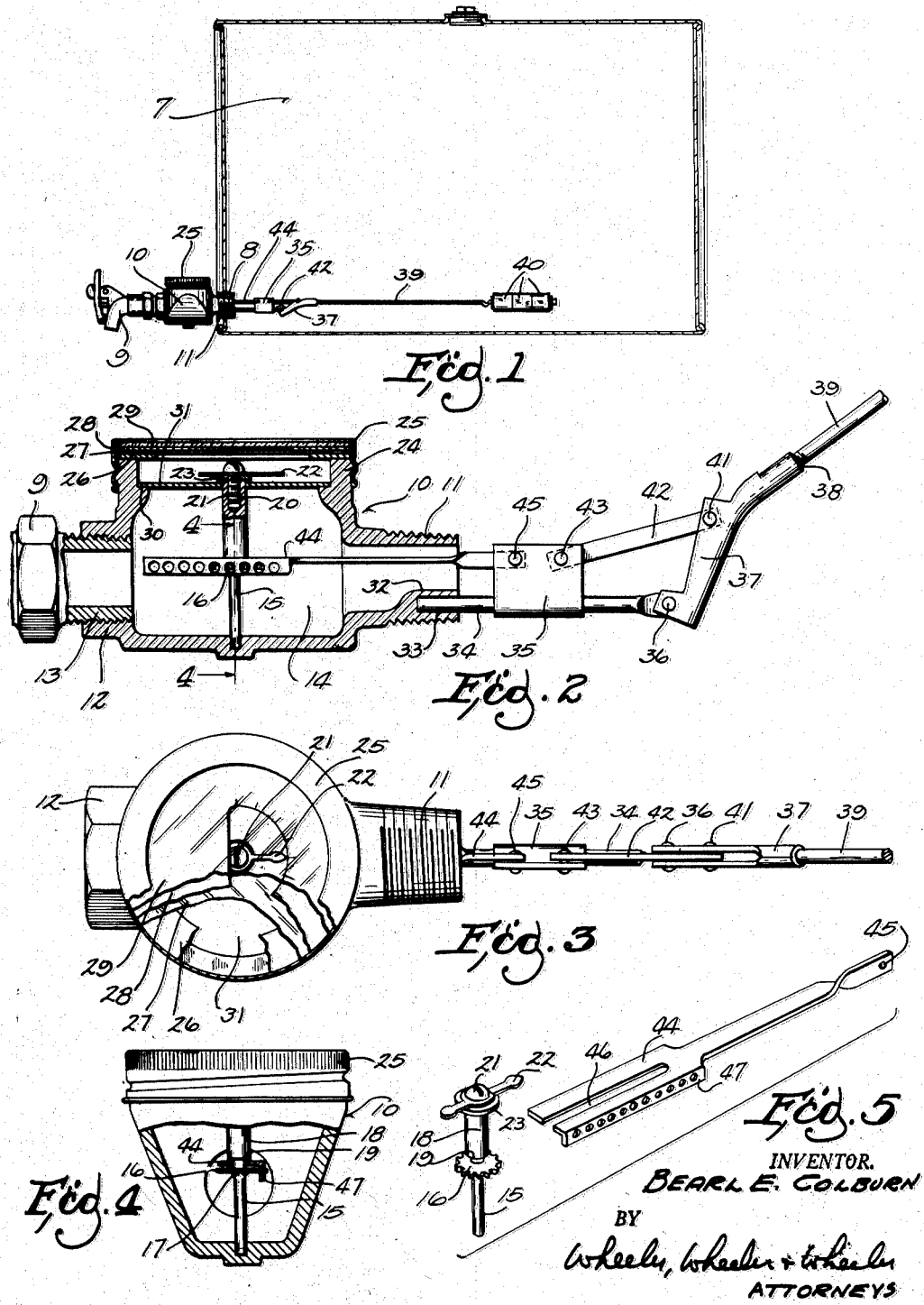

2,629,260

UNITED STATES PATENT OFFICE 2,629,260

DRUM GAUGE HAVING ALIGNED FAUCET AND DRUM COUPLING

Bearl E. Colburn, Green Bay, Wis.

Application March 18, 1948, Serial No. 15,588

2 Claims. (Cl. 73—317)

This invention relates to a drum gauge having aligned faucet and drum couplings providing a straight passage through which the pointer actuating connections operate.

It is the primary object of the invention to provide a gauge body or fitting having a male coupling element adapted to be screwed into the opening of a barrel or drum, and an aligned female coupling element adapted to receive the faucet, whereby flow from the drum to the faucet occurs upon a rectilinear path relatively unimpeded. It is my further purpose to provide a device in which a pointer shaft extending transversely of the rectilinear passage through which flow occurs is actuated by simple connections including an operating member reciprocable longitudinally of such passage.

It is a further object of the invention to provide a device of universal application, requiring only a change in dial calibrations and a change in length of the flow rod to be adapted for drums of different sizes.

It is a further object of the invention to provide a novel and improved means for operating the pointer of the gauge, such means including an elbowed float arm and a cross head provided with a guide mounted at the end of the fitting nipple, the arrangement being such that the guide and the cross head, the elbowed float arm and the float, together with the connecting linkage, are all receivable through the delivery opening of the barrel or drum.

Further objects of the invention include a simple means for adjusting the pointer for calibration; a novel member for converting rectilinear reciprocation into rotative movement into actuation for the pointer; and a device which, without locking the float arm in its low level position, can be screwed into a full drum, the float being so positioned that it will "cam" around the curved interior of the drum during the rotation of the fitting. These and other objects of the invention will be more apparent from the following disclosure thereof.

In the drawings:

Fig. 1 is a view in side elevation of my improved gauge assembled with a faucet and drum, the latter being shown in section.

Fig. 2 is an enlarged detail view of the gauge casing in section, portions of the operating mechanism being illustrated in elevation.

Fig. 3 is a plan view of the parts shown in Fig. 2, portions being broken away to expose the interior construction.

Fig. 4 is a view of the device in end elevation, portions thereof being broken away to the plane indicated by the section line 4—4 in Fig. 2.

Fig. 5 is a detail view illustrating in perspective the pointer, pointer shaft and gear, and the gear actuating member, as these parts appear somewhat separated.

My improved gauge is applicable to any standard barrel or drum such as the drum indicated at 7 in Fig. 1. Such a drum has a threaded opening at 8 adapted to receive a dispensing faucet such as that shown at 9. My improved gauge comprises the casing 10 having a threaded nipple 11 receivable into the tapped opening 8 and a threaded socket at 12 which receives the complementary nipple 13 of the faucet 9. Thus, the casing 10 intervenes between the drum and the faucet, and it will be noted that the inlet through the nipple 11 and the delivery through the socket 12 are aligned, providing a straight passage through the chamber 14 in the interior of casing 10.

Disposed vertically in the chamber 14 is the pointer shaft 15 which carries a gear 16 as best shown in Figs. 4 and 5. Above the gear, which may be soldered to the shaft as shown at 17 in Fig. 4, the shaft is enlarged at 18, having a shoulder 19 spaced from the gear. At its upper end, the enlarged portion 18 of the shaft is provided with a tapped opening 20 for the screw 21 which tightens the pointer 22 upon the washer 23. If the screw is loosened, the pointer may readily be adjusted angularly respecting the shaft for the purpose of calibration. The tightening of the screw will hold the pointer to the shaft to rotate therewith.

The top of the casing 10 is annular in cross section and externally threaded at 24 to receive the clamping ring 25. Seated on the top of the casing and held by the clamping ring 25 are the annular gasket 26, a transparent disk 27, a disk 28 which is preferably made of metallic foil and printed with any desired calibrations, and a top transparent disk 29 which is preferably relatively heavy. To prevent tampering, I preferably, although not necessarily, apply an adhesive before screwing on the retaining ring 25 so that such ring can be removed only with a wrench.

The upper part of chamber 14, in which the pointer 22 operates, may communicate freely with the lower part of such chamber if desired, but I prefer to provide at 30 an interior annular shoulder in the upper part of the casing upon which I seat a disk 31 which provides a bearing for the enlarged portion 18 of the pointer shaft. While the liquid dispensed through the gauge body may communicate with the partitioned portion of chamber 14 in which the pointer 22 operates, it will be apparent that there can be no substantial flow through the chamber portion thus partitioned by disk 31.

On the lower side of the nipple 11 I provide a boss at 32 having an aperture 33 in which is fixed a bar 34 serving as a guide for a cross head member 35. Pivoted at 36 to the end of the bar 35 is an elbowed float lever 37 provided at its end with a tapped opening to receive the threaded end 38 of a float rod 39, at the end of which any desired number of float elements 40 are mounted.

At or near the elbow in lever 37 is a fulcrum 41 for the link 42 which is also pivoted at 43 to the cross head 35, the arrangement being such that as the float at the end of rod 39 rises and falls, movement will be communicated from the elbowed lever 37 through link 42 at the cross head 35 to reciprocate the cross head on the guide bar 34.

Motion is communicated from the cross head to the gauge pointer 22 by means of the actuating member 44 which, for perfect freedom of movement, is preferably, though not necessarily, pivoted at 45 to the cross head. The member 44 may be made of a stamping to comprise a plate having a slot 46 which is received on shaft 15 between the shoulder 19 and the gear 16. The plate has a longitudinally extending downwardly turned flange at 47 provided with a series of apertures in which the successive teeth of the gear 16 engage to receive motion from the actuating member 44 as such member is reciprocated longitudinally of the discharge passage in consequence of the reciprocated motion imparted to the cross head 35 by the float. The margins of the plate along the slot 46 engage the shaft 15 to receive guidance therefrom and thereby to maintain the proper mesh of the apertured flange 47 with the teeth of the gear 16, while physical support for the actuating member is provided by the gear. Since the movement of the cross head is rectilinear, the only reason for the fulcrum at 45 is to permit free self-adjustment of the actuating member with respect to the pointer shaft and gear so that such member can take its position from the shaft and gear.

As is evident in Fig. 1, the float, float rod, float lever 37, link 42, cross head 35, and guide bar 34 all lie within the projected diameter of the nipple 11, or sufficiently close thereto so that the parts in the position illustrated in Fig. 1 can readily be manipulated through the delivery opening 8 of the drum. Assuming the drum to be full when the float is introduced, the float will tend to rise in the drum, but the elbowed lever carries the float rod in a position such that regardless of the thrust of the float, the curved interior surface of the drum will cam the float toward the aligned position of Fig. 1 during such rotation of the gauge fitting as is required to screw the nipple 11 into the drum.

With the gauge fitting applied to the drum and the sight disks properly positioned to expose the pointer 22 to view, the faucet 9 is screwed into the gauge fitting, and the assembly is ready for use.

It is quite an advantage in the use of the device that the liquid to be dispensed from the drum can flow rectilinearly through a straight passage from the drum to the faucet, as any angle or change of direction in the delivery passage constitutes a material obstruction to flow. It is also advantageous that the operating mechanism extending through this straight passage offers so little obstruction to the flow of the delivered liquid. The actuating member 44 comprises merely a very thin plate aligned with the direction of flow and offering very little cross section in opposition to flow. The gear 16 and the shaft 15 necessarily extending across the path of flow will be observed in Fig. 4 to present practically no obstruction in view of the enlarged cross section of the chamber 14 at this point.

While the materials of which my improved gauge are constructed are relatively immaterial, it may be observed that I prefer to use for the transparent disks at 27 and 29 a transparent plastic rather than glass. The disk 28 is preferably made of tinfoil, and to adapt the gauge for containers of different sizes, it is merely necessary to use an interchangeable dial with calibrations appropriate for the particular size of the drum with which the gauge is to be used. While the disk 28 is opaque, it will be noted to have in it a hole at 50 sufficiently large to expose the pointer 22 for the full range of movement thereof.

It is considered advantageous, in view of the position in which drums are ordinarily located, that my improved gauge may be read from above or either side according to the extent to which it is threaded into the drum.

I claim:

1. A gauge comprising a casing having a delivery passage, a guide member projecting from the casing, a cross head reciprocable on the guide member, a float lever having a link connecting it with the cross head and having a fulcrum connecting it with the guide member, and an actuating member connected with the cross head and projecting longitudinally of said passage, and an indicator having an operative driving connection with said member to receive motion therefrom.

2. In a gauge of the character described, the combination with a casing provided with a threaded nipple having an inlet passage, of a guide bar projecting axially from said nipple at one side of said passage, a reciprocating cross head slidably mounted on the bar and projecting therefrom toward the opposite side of the passage, an indicator within the casing having an operative driving connection from the cross head, and an elbowed float lever pivoted to said bar and having adjacent its elbow a link pivoted to said lever and pivoted to said cross head whereby to cause the cross head to reciprocate on the bar to actuate the driving connection on pivotal movement of the float lever.

BEARL E. COLBURN.

REFERENCES CITED

The following references are of record in the file of this patent:

UNITED STATES PATENTS

| Number | Name | Date |
| --- | --- | --- |
| 864,013 | Martin | Aug. 20, 1907 |
| 1,072,122 | Johnston | Sept. 2, 1913 |
| 1,231,300 | Ritz-Woller | June 26, 1917 |
| 1,261,657 | Wales | Apr. 2, 1918 |
| 1,347,243 | Beardsley | July 20, 1920 |
| 1,423,411 | Finch | July 18, 1922 |
| 1,514,520 | Hazard et al. | Nov. 4, 1924 |
| 1,997,002 | Ledoux | Apr. 9, 1935 |
| 2,118,727 | Hanes | May 24, 1938 |
| 2,216,917 | Klumb et al. | Oct. 8, 1940 |

FOREIGN PATENTS

| Number | Country | Date |
| --- | --- | --- |
| 520,520 | Great Britain | Apr. 25, 1940 |